INVENTOR.
LESLIE M. FORSYTH
By Norman Gerlach
Atty.

INVENTOR.
LESLIE M. FORSYTH
By *Norman ...*
Atty.

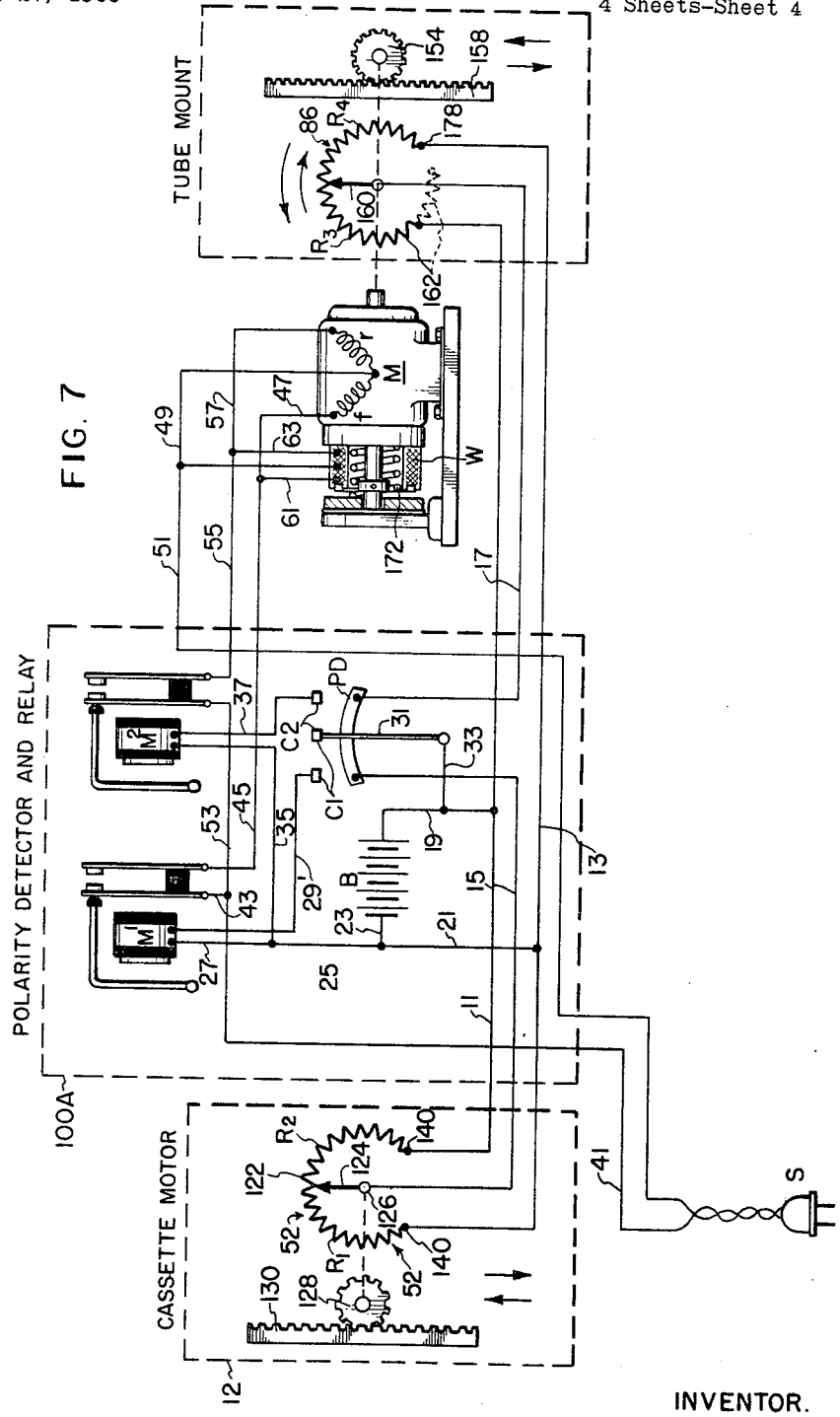

# United States Patent Office 3,492,482
Patented Jan. 27, 1970

3,492,482
APPARATUS EMPLOYING BALANCED ELECTRICAL BRIDGE CIRCUIT MEANS TO COORDINATE THE MOVEMENTS OF COOPERATING X-RAY FILM AND X-RAY TUBEHEAD HOLDERS
Leslie M. Forsyth, Norridge, Ill.
(7944 W. Strong St., Chicago, Ill. 60656)
Filed Sept. 27, 1966, Ser. No. 582,398
Int. Cl. H05g 1/08
U.S. Cl. 250—93
6 Claims

ABSTRACT OF THE DISCLOSURE

Electrically coordinated radiographic apparatus comprises a film holder support, a film holder mounted on said support for vertical up-and-down movement thereon, an X-ray tubehead holder support spaced from said film holder support, a tubehead holder mounted on said latter support for vertical up-and-down movement thereon parallel to the movement of the film holder, and balanced electrical bridge circuit means for causing one of the movable supports to move in the same direction as the other movable support when the latter support is vertically displaced from an initial position.

---

The present invention relates to improvements in radiographic apparatus and has particular reference to a novel means whereby an X-ray sensitive film holder such, for example, as a cassette changer may be adjusted to different heights by a technician and the associated X-ray tube support will automatically follow up-and-down movements of the film holder and ultimately come to rest in the proper position so that the X-ray tube will project X-rays centrally upon the X-ray sensitive film that is carried by the film holder. The invention is, however, not limited to such use and the coordinating equipment or mechanism of the present invention may, if desired and with or without modification as required, be employed in connection with radiographic equipment, fluoroscopic equipment, or photofluoroscopic equipment for the purpose of causing the X-ray emitting apparatus to follow the movements of the X-ray sensitive film or screen holder, regardless of whether the involved movements are vertical, horizontal or otherwise. Irrespective of the particular use to which the invention may be put, the essential features thereof are at all times preserved.

Heretofore, in coordinating the movements of a cassette changer or other similar piece of equipment with those of an X-ray tubehead so as to match the level thereof, it has invariably been the practice to employ some sort of mechanical connection between the two relatively movable parts or supports. Pulley-supported cables or sprocket-supported chains are most frequently used for this purpose and when these are employed, simultaneous and coordinated movement between the relatively movable parts results. Mechanical connections are, however, not altogether satisfactory from the standpoint of both feasibility of design and carefree operation. Neither are they practical from the standpoint of ease of manipulation.

Where such mechanical connections are utilized, extremely high tolerances must be maintained in order to attain the desired accurate follow-up, and provision must be made for repeated and timely adjustments to compensate for wear and cable or chain elongation. Headroom is often at a premium since the cable or chain system usually passes overhead. Operator fatigue is enhanced since it is necessary for the technician to overcome the inertia and frictional retardation of both movable components whenever a position change is initiated and, subsequently, to overcome the momentum of both components to prevent over-positioning of the parts. Practically insurmountable difficulty of design is encountered when it is necessary to provide for altering the distance between the tubehead and the cassette changer or other exposure equipment. Finally, further complications arise when it is necessary independently to raise or lower one component with respect to the other and, thereafter, maintain coordination between the movements of the components as, for example, to bring the X-ray tube to a new center in order to accommodate a smaller or a larger cassette size.

The present invention is designed to overcome the above noted limitations that are attendant upon the construction and use of conventional radiographic equipment or apparatus which employs a mechanical interconnection between the cassette changer or other exposure apparatus and the tubehead and, toward this end, the invention contemplates the provision of a novel electrical association between a cassette changer or other piece of exposure apparatus and its associated tubehead whereby the latter is caused to follow the movements of the former with great exactitude insofar as its terminal movement is concerned, the association being entirely devoid of moving mechanical connections so that the intervening space between the two components contains no obstructions which otherwise might interefere with free bodily movements of the operator or patient in and around the equipment as a whole.

The provision of an electrically coordinated radiographic apparatus such as has been briefly outlined above constitutes thep rincipal object of the invention and, in carrying out this object, the invention in its broadest aspect contemplates the provision of an electronic control bridge arrangement which operates upon the principle of a Wheatstone bridge to produce unbalanced or unequal voltages whenever the positions of the two associated radiographic components assume an out-of-phase relationship. The term "phase" as employed above refers to a desired positional relationship between the components rather than to sinusoidal electrical or mechanical harmonic phase. The magnitude and polarity of these unbalanced voltages are detected and relay circuitry is set into operation to actuate mechanism tending to restore the components to their desired phase relationship.

More specifically, utilizing as coordinated components for exemplary purposes a vertically movable sensitive film holder and a vertically movable X-ray tubehead, a signal potentiometer is mounted on and moves bodily with the film holder while a feedback potentiometer is mounted on and moves bodily with the tubehead. The wiper arm of each potentiometer is caused to traverse its associated resistance element in timed relationship with respect to the vertical displacement of its respective component. A reference voltage is applied in parallel relationship to the two potentiometer resistance elements and also the two wiper arms which variably divide their associated resistance elements into two Wheatstone bridge resistors, and such resis'ance elements and wiper arms are connected to a detector device which senses the magnitude and polarity of any potential which may occur across the two wiper arms. When the ratio of the two resistors of one potentiometer equals the ratio of the two resistors of the other potentiometer, the Wheatstone bridge circuit is in balance and no potential appears across the two wiper arms. Thus, no signal is transmitted to the detector device. When these ratios are unequal, a signal of a given polarity is transmitted to the detector device, depending upon the direction of the unbalance. A reversible electric motor operates under the control of the detector device to raise or lower the tubehead, elevation of the tubehead taking place when the detector device senses a signal of one polarity and lowering of the tubehead taking place when the detector device senses a signal of the opposite polarity. Since the wiper arm of the feedback potentiometer moves commensurately with the vertical movements of the tubehead, the signal voltage that is initiated by a relative displacement of the film holder with respect to the tubehead is gradually reduced to nothingness as the wiper arm of the feedback potentiometer reaches a position commensurate with the position of the wiper arm of the signal potentiometer where the resistance ratios of the two potentiometers are equal and the Wheatstone bridge circuit is in balance. The detector device (which preferably is in the form of an amplifier) is then in a condition of null balance and no current is supplied to the electric motor which drives the tubehead. It will be understood, of course, that for simplicity of electrical and mechanical expediency, the resistance elements of the two potentiometers are of identical ohmic value and that the involved gear or other driving ratios whereby the rotation of the potentiometer wiper arms is correlated with the vertical movements of their associated components are preferably identical although it is possible to employ different ohmic values and gear ratios if the discrepancies are compensated for by other means.

From the above brief description it will be appreciated that to secure the desired correlation between the movements of the film holder and the tubehead, it is necessary for the operator merely manually or otherwise to raise or lower the film holder on its sliding support to a desired position. Initial displacement of the film holder to an out-of-phase position with respect to the tubehead will unbalance the Wheatstone bridge circuit as previously described whereby a polarity signal will be forwarded to the detector device which will actuate appropriate relay mechanism and initiate energization of the tubehead driving motor in a direction tending to restore the Wheatstone bridge circuit to a condition of balance. Such energization of the electric motor will cause a consequent vertical movement of the tubehead in a direction tending to bring it into proper phase with the film holder.

The invention is susceptible to many refinements, certain of which appear herein and others of which have been omitted in the interests of clarity of disclosure. For example, one disclosed feature of the invention resides in the employment of an automatically operable solenoid-actuated brake on the electric motor which controls the vertical movements of the tubehead. Such a brake is effective immediately to terminate movements of the tubehead when a condition of phase has been attained, thus preventing overrunning of the tubehead and a consequent hunting action of the bridge circuit.

A further feature of the invention resides in the provision of a means for manually adjusting the rotational or angular position of the feedback potentiometer casing and, consequently, of the arcuate resistance element that is associated therewith. Since the position of the wiper arm of this potentiometer is a function of the position of the tubehead, turning of the potentiometer casing in one direction or the other throughout a predetermined angular extent has the effect of unbalancing the Wheatstone bridge circuit and causing the restoring action of the detector amplifier to become effective to bring the tubehead to a new level or phase relation and thus restore the wiper arm to a new position of Wheatstone balance. With a new phase relationship between the film holder and tubehead thus established, this relationship is maintained during future manipulations of the tube holder. Such an arrangement will be found useful when a change in level of the tubehead is required to accommodate different sizes of X-ray sensitive films and film holders.

A still further advantageous feature of the present invention resides in the fact that the distance between the film holder and the tubehead may be varied at will without requiring any extraneous adjustments other than those required to shift one of the two radiographic components toward the other. No mechanical adjustments are required on either component and the functional electrical circuitry that is associated with the two components is in no way disturbed or altered by the repositioning of either component.

Other objects and advantages of the invention not at this time enumerated will readily suggest themselves as the nature of the invention is better understood from a consideration of the following detailed description.

In the accompanying four sheets of drawings forming a part of this specification, the invention is illustrated purely for exemplary purposes as being applied to the coordination of movements between a cassette changer and an X-ray tube stand. It will be understood, however, that the principles disclosed herein are equally applicable to the correlation of a wide variety of remotely positioned radiographic components other than those disclosed herein.

In these drawings:

FIG. 7 is a schematic electrical diagram showing a simplified equivalent circuit for that disclosed in FIG. 6.

Figure 1:
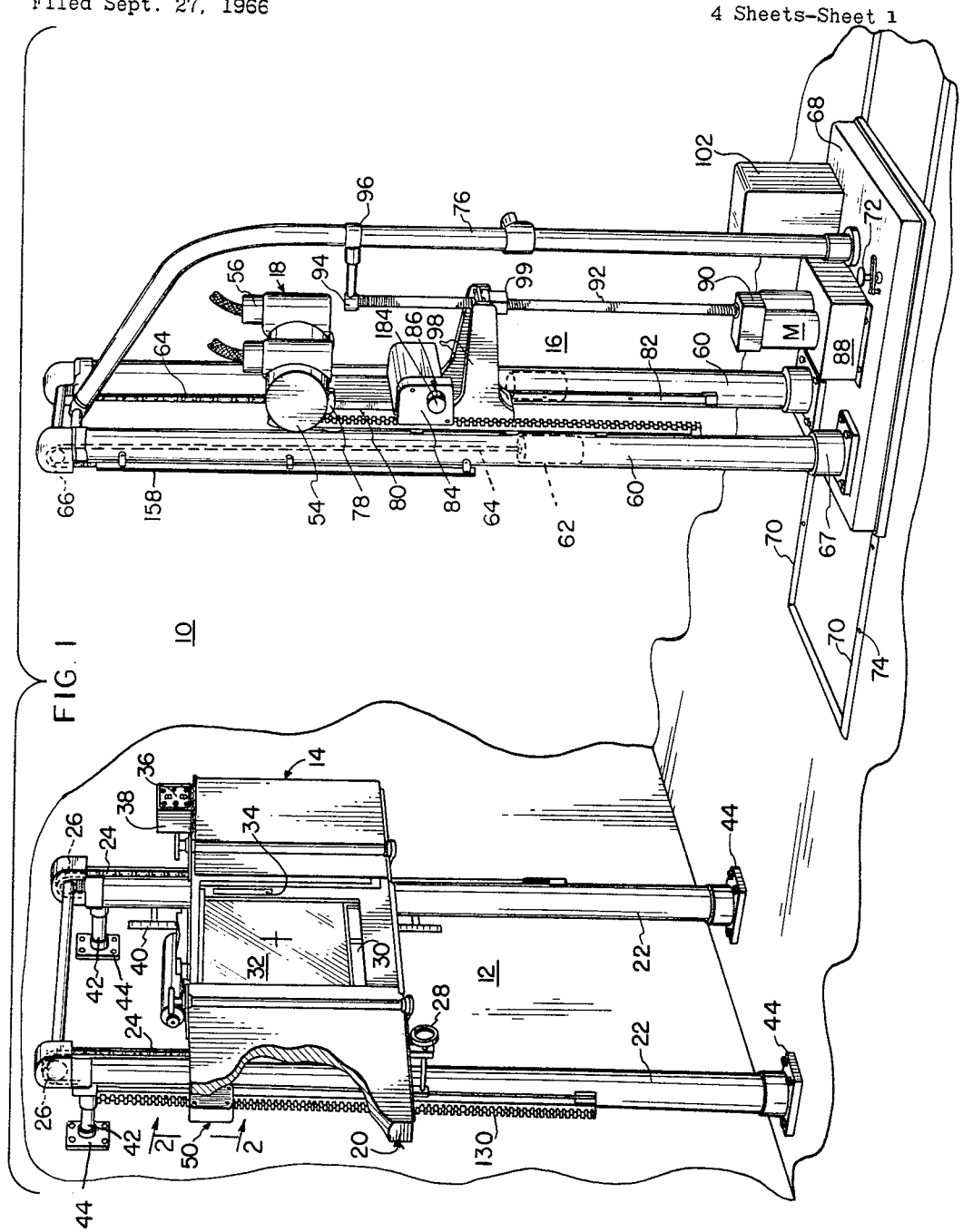
FIG. 1 is a perspective view of a cooperating cassette changer and tube stand embodying the principles of the present invention whereby the movements of the tube stand are correlated with initial movements of the cassette changer.

Referring now to the drawings in detail and in particular to FIG. 1, a radiographic installation or apparatus embodying the principles of the present invention is designated in its entirety by the reference numeral 10 and includes a film holder assembly 12 in the form of a vertically movable, manually settable, column-supported cassette holder 14, and an associated vertically movable X-ray generator assembly 16 in the form of a column-supported tubehead assembly 18.

Except for the provision of an electrical interconnection between the two assemblies 12 and 16 whereby the vertical movements of the cassette holder 14 and the tubehead 18 are correlated, both assemblies may be of any desired conventional construction. For exemplary purposes, the cassette holder is of the general type that is shown and described in United States Patent No. 2,938,120, granted to me on May 24, 1960, and entitled "X-Ray Filter Grid Assembly and Actuating Means Therefor," while the tubehead and its mounting means is of the type that is shown and described in my copending United States patent application Ser. No. 582,574, filed on Sept. 28, 1966, and entitled "Radiographic X-Ray Tube Stand and Stereoshift Mechanism Employing a Hypocoloidal Planetary Gear Drive."

For a full understanding of the nature and operation of the cassette holder 14, reference may be had to the aforementioned patent but, for purposes of description herein, it is deemed sufficient to state that this holder involves in its general organization a vertically extending rectangular framework 20 which is capable of being vertically adjusted on hollow standards 22 by means of supporting chains 24. The latter pass over shielded or housed sprockets 26 at the upper ends of the standards 22, the framework 20 being suitably counterbalanced by weights (not shown) within the hollow standards 22 and attached to the free ends of the chains 24. The details of the supporting and adjusting mechanism for the framework 20 form no part of the present invention and have not been completely illustrated herein, it being understood, of course, that other mechanism may be employed and that the cassette holder or other X-ray film holder may be mounted upon a wall or otherwise appropriately supported in its operative relationship with respect to an X-ray tube for proper exposure of the X-ray sensitive film that is associated with the cassette by means of which the film is positioned within the framework 20. A conventional locking knob 28 is provided for holding said framework in any selected position of vertical adjustment as common and well understood in radiographic art.

The cassette holder 14 includes a pair of laterally shiftable cassette-supporting clips, one of which appears at 30 for retaining an X-ray film-containing cassette 32 in position for exposure to X-rays emanating from the tubehead 18. It will be understood that the clips 30 are selectively shiftable into and out of position to bring the active cassette within the confines of a frame opening 34 where it will be susceptible to X-ray exposure as is conventional in the art. The clips are motorized for sliding movement in opposite directions and are operated under the control of one of a series of control buttons 36 on a control box 38 that is mounted on the framework 20. Vertical adjustments of the framework 20 may be conveniently made by the simple expedient of forcing the framework upwardly or downwardly to a desired location with reference to a stationary scale 40 which is mounted on one of the standards 22 and thereafter locking the framework in place by means of the knob 28. The upper ends of the standards 22 may be steadied by brackets 42 which are fixedly connected to an adjacent wall surface while the lower ends of the standards may be mounted on the subjacent floor surface by means of cup-like brackets 44. Numerous other ancillary details of the cassette holder 14 and its mounting means have been illustrated in FIG. 1 but since they bear no direct relation to the present invention they have not been described herein. A potentiometer housing 50 containing a signal potentiometer 52 and its associated gearing is supported on the framework 20 (see FIGS. 2 and 3) and constitutes one of the principal electrical components of the present invention. The function of the potentiometer will be made clear presently.

The assembly 16 involves in its general organization the previously mentioned tubehead 18. The latter may be of any commercially available construction and in the illustrated form it is shown as having the usual generator casing 54 to which current is supplied from a suitable source (not shown) by way of electrodes 56 in connected relation with conductors 58. The tubehead 18, like the cassette holder 14, is vertically movable on hollow standards 60 and is similarly counterbalanced by weights 62 which are disposed within the standards and are attached to chains 64. The latter pass over shielded or housed pulleys 66 at the upper ends of the standards 60. The lower ends of the standards 60 are centered within cup-like brackets 67 on a slidable platform 68 which travels on rails 70, a locking pin 72 being provided for cooperation with sockets 74 in one of the rails to the end that the tube stand as a whole may be located and locked at selected distances from the cassette holder 14. Vertical alignment of the pair of standards 60 is maintained by means of an arched strut tube 76 which also serves as a reaction support for certain mechanical instrumentalities that are associated with the component-coordinating mechanism of the present invention as will be described presently.

As is the case in connection with the cassette holder 14, the assembly 16 also is possessed of numerous ancillary details which are not pertinent to the present invention and, therefore, have not been described in detail. For example, the radiographic equipment that is associated with the assembly 16 is of the stereo type which is to say that the tubehead 18 is capable of angular tilting movements in a fore-and-aft direction to the end that the X-rays emitted therefrom may at all times be focused or directed to the center of a given X-ray sensitive film, regardless of the size of the latter. The stereo movements of the tubehead are automatic and they provide for oscillation of the tubehead at two different amplitudes. Although the tubehead 18 is shown as being cradled for limited rocking movement within vertically slidable side supports 78 for stereo movements, the specific means for effecting such rocking movements has been omitted from the present disclosure since it bears no relation to the present disclosure since it bears no relation to the present invention. Reference may be had to my above copending patent application Ser. No. 582,574 for a full disclosure of the stereo aspects and other details of the assembly 16.

The tubehead 18 is mounted on a vertically shiftable carriage in the form of a rectangular frame 80 which travels in opposed guide channels 82 on the hollow standards 60. Secured to the frame 80 so as to be movable bodily with the tubehead 18 is a potentiometer housing 84 containing a feedback potentiometer 86 and its associated gearing (see also FIGS. 4 and 5) by means of which the potentiometer setting is correlated with the elevation of the tubehead 18. The two potentiometers 52 and 86 constitute counterpart components of a balance bridge circuit which will subsequently be described in detail when the electrical instrumentalities which are associated with the present invention are set forth.

The raising and lowering movements of the frame 80 are effected automatically under the control of a reversible electric motor M which is supported on a pedestal 88. The latter is carried by the platform 68 and operates through a gear reduction device 90 selectively to drive a vertical feed screw 92 in opposite directions. The upper end of the feed screw is piloted or journalled at 94 in the outer end of a fixed bracket 96 on the central portion of the strut tube 76. The carriage-supported frame 80 has secured thereto two horizontally extending lift arms 98 which carry at their outer ends a nut 99 which is threadedly received on the feed screw 92 and thus the entire carriage including the frame 80 and its associated tubehead 18 and potentiometer housing 84 are constrained to shift vertically, either upwardly or downwardly, depending upon the direction of rotation of the feed screw 92. The motor M is adapted to be selectively energized for rotation in opposite directions under the control of an amplifier 100 (see FIG. 6) which is enclosed within a housing 102 on the platform 70. The nature of such housing will be set forth presently when the electrical circuitry of the present invention is described in detail hereafter.

Figure 2:
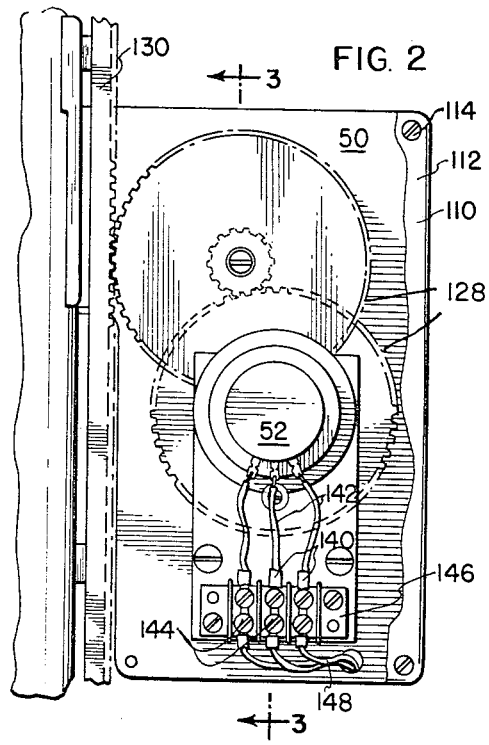
FIG. 2 is an enlarged fragmentary rear elevational view of a portion of the cassette changer of FIG. 1, the view being taken in the general direction of the arrows 2—2 and in the vicinity of a potentiometer housing in which the cover plate has been broken away in the interest of clarity.
Figure 3:
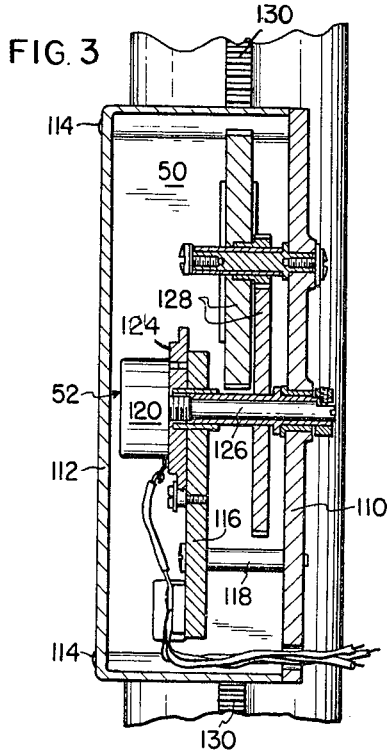
FIG. 3 is a vertical sectional view taken substantially along the line 3—3 of FIG. 2.

Referring now to FIGS. 2 and 3 wherein the details of the potentiometer housing 50 and its contents are best illustrated, the housing includes a back plate 110 and, in addition, a cover plate 112 which is cup shape design and is secured to the back plate by screws 114. A fixed shelf 116 is disposed within the housing 50 and is supported from the back plate 110 by post and screw assemblies 118. The previously mentioned signal potentiometer 52 is of a commercially available type and includes a potentiometer shell 120 which is of cylindrical design and within which there is disposed the usual arcuate resistance element 122 (see FIG. 7) and a rotary wiper arm 124. The potentiometer shell 120 is non-rotatable and is fixedly secured to a disk 124 which, in turn, is secured to the shelf 116. The wiper arm 124 is carried by the usual rotary potentiometer stem 126 and the latter is piloted at its outer end in the back plate 110 as shown in FIG. 3. The potentiometer stem 126 is effectively geared through a train of gearing 128 to a fixed vertically disposed toothed rack 130 which is secured to one of the two standards 22 of the film holder assembly 12, the nature of the gearing involved and the vertical extent of movement of which the cassette holder 14 is capable being such that a full traverse of the path of movement of the cassette will cause a complete sweep of the potentiometer over an effective portion of the resistance element 122, although not necessarily over the entire element from end-to-end. Considering the physical aspects of the potentiometer 52 as illustrated in FIGS. 2 and 3, the three potentiometer terminals which have collectively been designated as 140 are connected by lead wires 142 to respective binding posts 144 that are associated with a conventional terminal strip 146. Connections are made by lead wires 148 to the amplifier that is associated with the housing 102.

Figure 4:
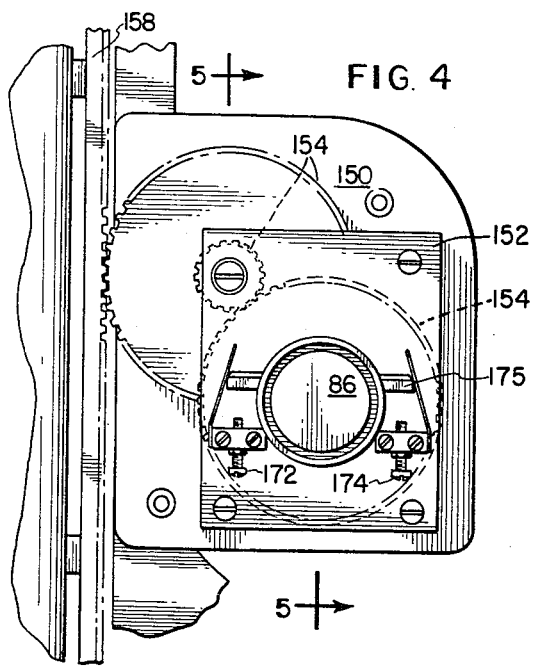
FIG. 4 is an enlarged fragmentary side elevational view of a portion of the tube stand of FIG. 1, the view being taken in the vicinity of a potentiometer housing from which the cover plate has been removed in the interest of clarity.
Figure 5:
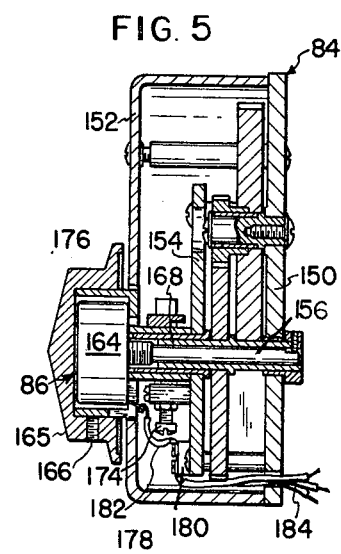
FIG. 5 is a sectional view taken substantially along the line 5—5 of FIG. 4.

Referring now to FIGS. 4 and 5 wherein the details of the potentiometer casing 84 are illustrated, the casing is similar in its design to the potentiometer casing 50 in that it includes a back wall 150, a cover plate 152, and an internal shelf 154, the latter serving in combination with the back wall 150 to support portions of gearing 154 by means of which the potentiometer stem 156 is operatively connected to a vertically disposed toothed rack 158 on one of the hollow supporting standards 60. As shown in FIG. 7, the potentiometer 86 is provided with a wiper arm 160 which traverses an arcuate resistance element 162, the latter being fixed within the potentiometer shell 164 so as to assume varying angular relationships commensurate with any angular turning movements which may be imparted to the shell. Whereas the potentiometer shell 120 that is associated with the signal potentiometer 52 is fixed, the shell 164 of the feedback potentiometer 86 is capable of limited turning movement with respect to the casing 84 and, toward this end, the frictional retardation that is inherent between the wiper arm 160 and the resistance element 102 may be overcome manually by means of a control knob 165 which is telescopically received over the shell and is secured thereto by a set screw 166. The potentiometer shell 164 may be frictionally retarded in its movement with respect to the casing 84 by any suitable means as, for example, the frictional drag that is offered by a tubular retaining rivet 168.

Although infinite adjustment of the angular position of the potentiometer shell 164 may be resorted to, in actual practice only two extreme positions of the shell are resorted to. These two positions of the shell are limited by means of a pair of adjustable limit screws 172 and 174 which are selectively engageable with a stop bar 175. The latter is carried by a sleeve 176 which moves with the shell 164 and surrounds the tubular retaining rivet 168. As will be set forth in greater detail presently, manual movement of the shell 164 between its two extreme angular positions as determined by the limit screws 172 and 174 is employed for the purpose of effecting relative displacements between the vertically movable tubehead 18 and the cassette holder 14 to accommodate cassettes of varying sizes, these sizes in commercial practice being only two in number. Except for the provision of a rotational adjustment for the potentiometer shell 164, the potentiometers 120 and 164, their mountings and their fittings are similar. As shown in FIG. 5, the potentiometer terminals 178 are connected to a terminal strip 180 by lead wires 182. Connections from the terminal strip 180 to the amplifier 100 within the housing 102 are made by lead wires 184. As in the case with the signal potentiometer 52 and its associated rack and gearing, the rack and gearing that are associated with the feedback potentiometer 86 are so designed that the vertical extent of movements of which the carriage frame 80 is capable is such that a complete sweep of the wiper arm 160 will take place over an effective portion of the resistance element 162 during a complete traverse of the path of movement of the tubehead 18.

Figure 6:
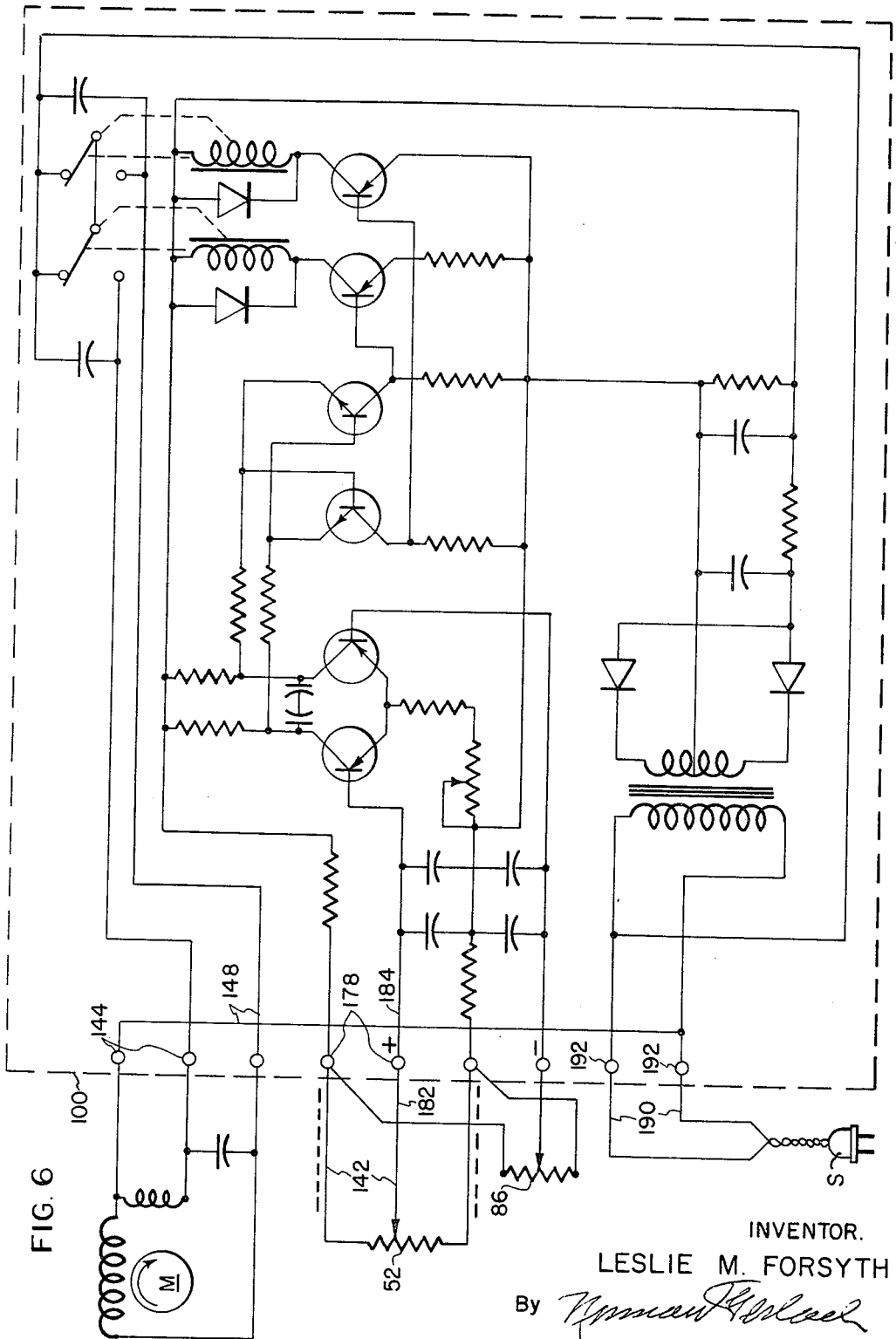
FIG. 6 is an electrical wiring diagram of a commercial embodiment of the invention.

Considering now the electrical aspects of the present invention, as shown in FIG. 6 there is disclosed an actual production circuit diagram of the film holder and tubehead coordinating mechanism of the present invention. The electric motor M, the signal potentiometer 52 and the feedback potentiometer 86 are portrayed by conventional draftsman's symbols and the amplifier 100 is shown as being of the solid state type. The physical lead wires 142, 144, 180, 184, etc. and other electrical connections shown in FIGS. 2 to 5, inclusive, are carried over into the diagram of FIG. 6 and two amplifier power input wires 190 are shown as leading to the amplifier terminals 192. In FIG. 7 a simplified equivalent circuit arrangement is shown and this latter circuit arrangement is deemed adequate to disclose the basic principle of the present invention so that only a superficial description of the production circuit diagram of FIG. 6 need be made herein. Such a superficial description will be made after the equivalent circuit diagram of FIG. 7 has been set forth.

Referring now to the equivalent circuit diagram of FIG. 7, it will be observed that the signal potentiometer 52 and the feedback potentiometer 86 establish a modified form of Wheatstone bridge circuit which operates upon the principle of Kirchoff's Network Laws to produce unbalanced ohmic resistance values resulting in small potential differences which are fed to a polarity detector PD which then effects selective energization of two relay magnets M1 and M2. The relay magnet M1, upon energization thereof, causes current from a source S to be passed through the forward winding $f$ of the reversible motor M, while the relay magnet M2, upon energization thereof, causes current to be passed through the reverse winding $r$ of the motor. The motor M, as previously described, controls the raising and lowering of the tubehead 18. In the equivalent circuit of FIG. 7, the Wheatstone bridge arrangement is supplied with a reference voltage from a battery B.

It will be observed that the wiper arm 124 of the signal potentiometer 52 is effect divides the resistance element 122 into two bridge resistors R1 and R2, while the wiper arm 160 of the feedback potentiometer 86 divides the resistance element 162 into the other two bridge resistors R3 and R4. The terminals 140 of the potentiometer resistance 122 are connected to the potentiometer terminals 178 by leads 11 and 13. The usual bridge galvanometer is replaced by the polarity detector PD and the latter is connected to the wiper arm terminals of the two potentiometers by leads 15 and 17. The four resistors R1, R2, R3 and R4, together with the leads 11, 13, 15 and 17 establish the aforementioned modified Wheatstone bridge arrangement. Reference current is applied to the bridge from the battery B through leads 19 and 21.

From the above description it will be observed that when the ratio of resistor R1 over resistor R2 equals the ratio of resistor R3 over R4, the bridge will be in electrical balance and no signal current will be supplied to the polarity detector PD. However, when the aforementioned ratios become unequal by reason of movement of the wiper arm 124 in one direction or the other, the bridge will become unbalanced and a signal current of one polarity or the other (depending upon the direction of movement of the wiper arm 124) will be fed to the polarity detector PD. If the signal is of negative polarity for instance, a pair of contacts $c1$ will become closed and the relay magnet M1 will become energized. The circuit for the magnet M1 extends from the negative side of the battery B, through leads 23, 25, 27, magnet M1, lead 29, contacts $c1$, contact arm 31, and leads 33 and 19 back to the positive side of the battery B. If the signal is of positive polarity, a pair of contacts c2 will become closed and the relay magnet M2 will become energized to establish a circuit from the battery B, through leads 23, 25, 35, magnet M2, lead 37, contacts c2, contact arm 31 and lead 33 back to the battery. In the case of energization of the magnet M1, a circuit will be established through the forward winding F of the motor M, thus causing the motor to operate in a direction which will cause the terminal drive gear of the gearing 154 to rotate in a counterclockwise direction as viewed in FIG. 7 and thus cause the carriage frame 80 (see FIG. 1) to move upwardly. The circuit for the motor winding F extends from the source S, through leads 41, 43, the contacts of the relay magnet M1, leads 45, 47, forward winding F, and leads 49, 51 back to the source S. In the case of energization of the magnet M2, a circuit will be established through the reverse winding R of the motor M, this circuit extending from the source S through leads 41, 53, the contacts of the magnet M2, leads 55, 57, winding R, and leads 49, 51 back to the source S. When this circuit is established the terminal gear of the gearing 154 will rotate in a clockwise direction to lower the frame 80.

It is to be noted at this point that upon either raising or lowering of the frame 80, the motor M will operate in a direction tending to shift the wiper arm 160 of the potentiometer 86 to a position wherein the bridge circuit including the four resistors R1, R2, R3 and R4 are in complete balance. When the wiper arm 160 reaches such a position, no signal will be prevalent at the detector device PD and, as a consequence, the contacts c1 and c2 will both become open, thus deenergizing whichever relay magnet M1 or M2 is, at that time, energized. The associated motor circuit will thus be deenergized and the motor will cease to operate.

In order that there shall be no overrunning of the Motor M and consequent hunting action of the frame 80, a solenoid actuated brake 170 is provided, the brake having a solenoid winding W which is effectively connected in electrical parallel to both motor windings F and R. The winding W is connected to the two windings F and R by leads 61, 47 and 63, 57, respectively, and it is provided with a common lead connection 65 extending to the source S through the lead 51. The brake 170 is spring-loaded toward its inoperative position as indicated at 172 and upon energization of either winding F or R, the loading effect of the spring is overcome and the brake becomes applied in order immediately to stop rotation of the motor shaft.

Considering now the operation of the herein described electrically coordinated radiographic apparatus with reference to the equivalent circuit represented in FIG. 7, and assuming the apparatus to be electrically connected to a source of current such as a commercial 120 volt AC power line, it may be further assumed that the bridge circuit previously described and involving the four resistances R1, R2, R3 and R4 will be in electrical balance inasmuch as any out-of-phase relationship between the elevations of the tubehead 18 and cassette holder 14 will be eliminated by the inherent operation of the apparatus immediately after the same is "plugged in" to the current source. At this time, the X-rays emitted by the tubehead 18 will strike the exact center of the exposure screen that is enclosed within the cassette 32. Assuming further that a patient is positioned in front of the cassette holder 14, the operator will then adjust the latter to the proper height by manually raising or lowering the same as the case may be. Considering a lowering operation to be required, the initial downward displacement of the cassette holder will cause clockwise rotation of the terminal gear of the gearing 128 as viewed in FIG. 7, whereupon the wiper arm 124 of the signal potentiometer 52 will rotate in a clockwise direction and increase the ohmic resistance of the resistor R1 and decrease the ohmic resistance of the resistor R2. The bridge circuit will thus become unbalanced and a negative signal will be directed to the polarity detector from the battery B, thus closing the contacts c2, energizing the relay magnet M2, and establishing a circuit through the reverse winding R of the motor M as previously described. The motor M will then effect simultaneous rotation of the terminal gear of the gearing 154 and the wiper arm 160 of the potentiometer 86 in a clockwise direction, thereby causing lowering of the frame 80 and the tubehead 18. Such movement of the wiper arm 160 is in a direction tending to restore the electrical balance of the bridge circuit and, when a balance has been attained, the ohmic relationship of the resistors R1, R2, R3 and R4 will be such that R1 divided by R2 will equal R3 divided by R4. At this point, no signal will be transmitted to the polarity detector PD and the apparatus will be in a condition of null balance with all of the circuit contacts open and with the tubehead 18 at such an elevation that the emitted X-rays will strike the center of the cassette-enclosed film.

If, initially, the operator is required to raise the cassette holder 14, similar circuit conditions to those just described will take place involving a signal of positive polarity and an energization of the relay magnet M1 instead of the magnet M2.

Returning now to the production circuit diagram of FIG. 6, the detector relay and amplifier 100 shown in this diagram perform all of the functions of the detector relay 100A of FIG. 7 and, additionally, provide several stages of amplification for relay-actuation purposes. A step-down transformer and current rectifying components are employed for supplying reference voltage to the Wheatstone bridge circuit. Since the basic principle of operation of the present invention is clearly understandable from the disclosure of FIG. 7 taken in connection with the foregoing description, it is deemed unnecessary to enter into a discussion of the specific solid state circuitry of FIG. 6, especially in view of the comparisons which have been set forth with relation to the two circuits.

The invention is not to be limited to the exact arrangement of parts shown in the accompanying drawings or described in this specification as various changes in the details of construction and in the specific electrical components employed may be restorted to without departing from the spirit or scope of the invention. Therefore, only insofar as the invention is particularly pointed out in the accompanying claims is the same to be limited.

Having thus described the invention what I claim as new and desire to secure by Letters Patent is:

1. An electrically coordinated radiographic apparatus comprising a film holder support, a manually settable film holder mounted on said support for raising and lowering movements, an X-ray tubehead holder support spaced from said film holder support, a tubehead holder mounted on said latter support for raising and lowering movements, a vertically disposed toothed rack fixedly mounted on each of said supports, a signal potentiometer mounted on the film holder and having a fixed shell and resistance element and a rotary wiper arm, a first gear train operatively connecting said wiper arm and the toothed rack on the film holder support whereby raising and lowering movements of the film holder will effect rotary motion of said wiper arm, a feedback potentiometer mounted on the tubehead holder and having a normally fixed shell and resistance element and a rotary wiper arm, a second gear train operatively connecting said latter wiper arm and the toothed rack on the tubehead support, a reversible electric motor having forward and reverse windings, means operatively connecting the electric motor to the tubehead holder in driving relationship, relay means operable to selectively energize said windings, means electrically connecting corresponding ends of said resistance elements and for supplying a predetermined reference potential across the thus connected ends to thus establish a balanced bridge circuit when predetermined resistance value ratios are effective across the sections of the resistance elements separated by the wiper arms, and polarity detecting means connected to the wiper arms and responsive to impulses of opposite polarity for selectively actuating said relay means.

2. An electrically coordinated radiographic apparatus as set forth in claim 1 and wherein the shell and resistance elements of the feedback potentiometer are mounted for limited manual rotational adjustment between two fixed positions to thus vary the predetermined resistance value ratios which are effective across the sections of the resistance element associated with the feedback potentiometer.

3. An electrically coordinated radiographic apparatus as set forth in claim 2 and including, additionally, means frictionally retarding the shell and resistance unit of the feedback potentiometer against rotational adjustment between said two positions.

4. An electrically coordinated radiographic apparatus as set forth in claim 2 and wherein the means operatively connecting the motor to the tubehead holder in driving relationship comprises a vertical worm shaft to which the motor is drivingly connected, said worm shaft having threaded engagement with an element on the tubehead holder.

5. An electrically coordinated radiographic apparatus as set forth in claim 3 and wherein the film holder support and the tubehead holder support are relatively adjustable toward and away from each other.

6. An electrically coordinated radiographic apparatus as set forth in claim 3 and wherein the tubeholder support is movable toward and away from said film holder support and has associated therewith means for selectively locking it in either of two selected fixed positions.

References Cited

UNITED STATES PATENTS

| | | | |
|---|---|---|---|
| 2,471,393 | 5/1949 | Caldwell et al. | 318—20.751 |
| 2,518,884 | 8/1950 | Guentner et al. | 250—61 |
| 3,260,908 | 7/1966 | Bostwick | 318—20.750 |

RALPH G. NILSON, Primary Examiner

C. E. CHURCH, Assistant Examiner

U.S. Cl. X.R.

250—92